United States Patent [19]

Matsuura et al.

[11] Patent Number: 4,530,983

[45] Date of Patent: Jul. 23, 1985

[54] PROCESS FOR POLYMERIZING ETHYLENE

[75] Inventors: Mitsuyuki Matsuura, Kameyama; Yoshiteru Kageyama, Yokkaichi; Akito Hagiwara, Yokkaichi; Takeo Shimada, Yokkaichi, all of Japan

[73] Assignee: Mitsubishi Petrochemical Company Limited, Tokyo, Japan

[21] Appl. No.: 458,843

[22] Filed: Jan. 18, 1983

[30] Foreign Application Priority Data

Jan. 22, 1982 [JP] Japan .................................. 57-8290

[51] Int. Cl.$^3$ ........................... C08F 4/02; C08F 10/02
[52] U.S. Cl. ..................................... 526/125; 526/124; 526/153; 526/348.2; 526/348.5; 526/348.6; 526/902
[58] Field of Search ........................................ 526/125

[56] References Cited

U.S. PATENT DOCUMENTS

| | | | |
|---|---|---|---|
| 4,107,413 | 8/1978 | Giannini et al. | 526/125 |
| 4,107,414 | 8/1978 | Giannini et al. | 526/125 |
| 4,410,672 | 10/1983 | Inazawa | 526/125 |

FOREIGN PATENT DOCUMENTS

| | | | |
|---|---|---|---|
| 3027885 | 2/1981 | Fed. Rep. of Germany | 526/125 |
| 1292853 | 10/1972 | United Kingdom | 526/125 |
| 1310547 | 3/1973 | United Kingdom | 526/125 |
| 1314258 | 4/1973 | United Kingdom | 526/125 |
| 1543103 | 3/1979 | United Kingdom | 526/125 |
| 2057468 | 4/1981 | United Kingdom | 526/125 |

*Primary Examiner*—Edward J. Smith
*Attorney, Agent, or Firm*—Oblon, Fisher, Spivak, McClelland & Maier

[57] ABSTRACT

A process for catalytic homo- or co-polymerization of ethylene under the conditions of a pressure of at least 300 kg/cm$^2$, a temperature of at least 180° C., a contact time with a catalyst of 10 to 150 seconds and substantial absence of a solvent is disclosed. The catalyst used comprises Components A and B where Component A is a solid composition prepared by mixing and pulverizing (1) a magnesium halide, (2) titanium trichloride, and (3) an electron donor and Component B is an organoaluminum compound containing a halogen.

10 Claims, No Drawings

PROCESS FOR POLYMERIZING ETHYLENE

BACKGROUND OF THE INVENTION

The present invention relates to the homopolymerization of ethylene or the copolymerization of ethylene with an α-olefin at a high temperature of at least 180° C. or more under a pressure exceeding 300 kg/cm$^2$.

Recently, polymerization of ethylene has been carried out in the presence of a Ziegler type catalyst at high temperatures and pressures by using a polymerizer for high-pressure polyethylene, as is described in British Patent Specification No. 828,828.

It is also known that ethylene can be copolymerized with an α-olefin by this method so as to produce straight-chain, low-density polyethylene having a controlled density.

The above-mentioned method is very advantageous in that, in the industrial production of straight-chain, low-density polyethylene, an existing apparatus for producing high-pressure polyethylene can be used as it is, which eliminates the necessity of an additional investment of capital. However, the use of a Ziegler type catalyst at high temperatures and pressures involves the following drawbacks as compared with conventional low-temperature, low-pressure polymerization processes using the Ziegler type catalyst.

1. The catalyst gets rapidly deactivated at high temperatures and pressures, and the catalytic activity thereof is low. Even when the catalytic activity is high, if the catalyst residue contained in the resultant polymer is thermally unstable, the residue will be converted into a coloring matter which deteriorates the quality and/or hue of the polymer.

2. In the copolymerization of ethylene with an α-olefin at high temperatures and pressures, the α-olefin must be present in the polymerization vessel in a much higher concentration than desired for the resultant copolymer because the ethylene is very highly reactive, while the α-olefin has remarkably low reactivity. For this reason, the amount of the α-olefin used per unit product becomes remarkably large in the industrial production of straight-chain, low-density polyethylene, whereby the cost of production is increased in conjunction with a high price of the α-olefin.

Therefore, the polymerization of ethylene at high temperatures and pressures requires a catalyst having characteristics such that (i) it is highly active and capable of providing a polymer having an excellent hue and (ii) it is capable of providing a high degree of copolymerization of an α-olefin in the case of the copolymerization of ethylene with the α-olefin.

SUMMARY OF THE INVENTION

With a view to overcome the above described problems to obtain an ethylene polymer, the present invention is intended to attain this object with a specific mode of practice and a specific catalyst system.

Thus, the process for polymerizing ethylene according to the present invention comprises bringing ethylene or ethylene and an α-olefin into contact with a catalyst comprising a combination of the following components A and B under the conditions of a pressure of at least 300 kg/cm$^2$, a temperature of at least 180° C., a contact time of 10 to 150 seconds, and substantial absence of a solvent:

Component A

A solid composition prepared by mixing and pulverizing the following compounds (1), (2), and (3):
(1) a magnesium halide
(2) titanium trichloride
(3) an electron donative compound.

Component B

An organoaluminum compound containing a halogen group.

Another process for polymerizing ethylene according to the present invention comprises bringing ethylene and an α-olefin into contact with a catalyst comprising a combination of the following components A, B, and C under the conditions of a pressure of at least 300 kg/cm$^2$, a temperature of at least 180° C., a contact time of 10 to 150 seconds, and substantial absence of a solvent, thereby to obtain a copolymer having a density of from 0.890 to 0.940 g/cm$^3$:

Component A

A solid composition prepared by mixing and pulverizing the following compounds (1), (2), and (3):
(1) a magnesium halide
(2) titanium trichloride
(3) an electron donative compound.

Component B

An organoaluminum compound containing a halogen group.

Component C

An organic acid ester.

DETAILED DESCRIPTION

1. Catalyst

(1) Component A

Component A is a solid composition prepared by mixing and pulverizing the following compounds (1), (2), and (3).

(1) Magnesium halide

Examples of magnesium halides are $MgF_2$, $MgCl_2$, $MgBr_2$, and $MgI_2$. $MgCl_2$ is preferable.

(2) Titanium trichloride

Titanium trichloride may be selected from various types of titanium trichlorides, for example, TiCl$_3$ (H) prepared by reducing titanium tetrachloride with hydrogen, TiCl$_3$ (A) prepared by reducing titanium tetrachloride with metallic aluminum, and TiCl$_3$ prepared by reducing titanium tetrachloride with an organoaluminum compound. Therefore, the titanium trichloride need not be pure TiCl$_3$. For example, the titanium trichloride may be titanium trichloride containing $\frac{1}{3}$ moles of AlCl$_3$ added thereto, such as TiCl$_3$ (A) or titanium trichloride containing such an auxiliary component as that introduced thereinto after the formation thereof.

(3) Electron donative compound

Among compounds known as an electron donative compound (hereinafter referred to as electron donor), the following compounds can be used: alcohols, ethers, ketones, aldehydes, carboxylic acids and esters.

(a) Alcohols

Monohydric or polyhydric (up to about tetrahydric) alcohols, ether alcohols and ester alcohols having approximately 1 to 20, preferably 3 to 4 carbon atoms such as, for example, methanol, ethanol, n-butanol, hexanol, and ethylene glycol.

(b) Ethers

Mono- through tetra-ethers having a total number of carbon atoms of from approximately 2 to 20 such as, for example, diethyl ether and dibutyl ether.

(c) Aldehydes

Aldehydes having approximately 1 to 10 carbon atoms such as, for example, acetaldehyde and propionaldehyde.

(d) Carboxylic acids

Mono- through tetra-carboxylic acids having approximately 1 to 20 carbon atoms such as, for example, an aliphatic acid such as, e.g., acetic acid, propionic acid, an aromatic acid such as, e.g., benzoic acid, and phthalic acid.

Metal salts of the above-mentioned carboxylic acids, for example, calcium acetate, magnesium benzoate and calcium stearate, are also usable.

(e) Ketones

Ketones having a total number of carbon atoms of from approximately 3 to 20 such as, for example, acetone, and methyl ethyl ketone.

(f) Esters

Esters of the above named alcohols and the above named carboxylic acids, for example, methyl acetate, methyl acrylate, ethyl benzoate and dibutyl phthalate. Esters of an aromatic acid are preferable.

Among these compounds, the compounds (b) ethers, (e) ketones and (f) esters are particularly preferable.

Quantitative ratio

The quantitative ratio of the compounds (1), (2), and (3) is not restrictive as long as the effect of the present invention is attained.

The quantitative ratio of magnesium halide or electron donor to titanium trichloride generally depends on the activity of the catalyst component prepared by mixing and pulverizing and the hue and odor of the polymer.

In the catalyst of the present invention, the quantitative ratio of magnesium halide to titanium trichloride is at least 2, preferably in the range of from 3 to 50, in terms of molar ratio. The electron donor is preferably mixed and pulverized in an amount of from 0.1 to 45% by weight, preferably, from 1 to 20% by weight, based on the total weight of the three ingredients.

Mixing and pulverizing

The mixing and pulverizing of the above named three ingredients (1), (2), and (3) can be carried out by using any pulverizing apparatus causing intimate mutual contact of these ingredients. The mixing and pulverizing should be carried out under the condition that these three ingredients do not come into contact with moisture or air. Various apparatus such as a rotary ball mill, rod mill, impact mill, and vibration mill may be used as long as the above stated requirement is satisfied. A satisfactory degree of mixing and pulverizing is such as to provide a significant improvement in the mixing and pulverizing of the three ingredients (1), (2), and (3). Therefore, the manner of pulverizing, the pulverizing condition, the pulverizing time and the like may be determined from this point of view. In the case of a vibration mill, a rotary ball mill, and the like, the time necessary for obtaining the desired catalyst composition may vary depending on the combination of various conditions, such as the proportion of filling of the balls, the proportion of filling of the sample to be pulverized, the diameter of the balls, the rotational speed or vibration frequency, and the pulverizing temperature. Generally, pulverizing for a period of up to 100 hours enables the resultant mixture to exhibit a satisfactorily improved catalytic effect. The pulverizing may be of a dry or wet type as required. In a typical manner of pulverizing, the three ingredients (1), (2), and (3) are pulverized after all of the ingredients have been mixed with each other. Alternatively, the ingredients may be successively added to the region of mixing and pulverizing over a certain period of time.

The component A may contain ingredients other than a magnesium halide, titanium trichloride and an electron donor. Examples of such arbitrary ingredients are silicon and aluminum. Silicon may be added in the form of silicon tetrachloride or other silicon halides, methylhydrogenpolysiloxanes (e.g. those having a viscosity of from approximately 10 to 100 centistokes) or other siloxanes during the preparation of the component A. Aluminum may be added in the form of aluminum trichloride or other aluminum halides during the preparation of the component A. The metal or metalloid ingredient (M) may be present in the component A in an atomic ratio of M/Ti of from approximately 0.01 to 0.2.

(2) Component B

The component B is a compound of the formula $R_{3-m}AlX_m$, in which R represents a hydrocarbon residue having 1 to 10 carbon atoms, X represents a halogen atom and m represents a number defined by $0 < m \leq 2$.

Examples of such compounds are alkylaluminum halides, such as diethylaluminum monochloride, diisobutylaluminum monochloride, ethylaluminum sesquichloride, and ethylaluminum dichloride. The alkylaluminum halides may be used in combination with trialkylaluminums or alkylaluminum alkoxides. In this case, the ingredient to be combined is preferably used in a molar ratio of the ingredient to alkylaluminum halide of from 0.01 to 0.5.

The amount of the component B alkylaluminum compound of the above-mentioned formula to be used is not limited to any specific value. In general, the alkylaluminum compound is used in an amount such that the atomic ratio of Al/Ti is in the range of from 1 to 1000, preferably from 1 to 100, in relation to the component A.

(3) Component C

The organic acid esters usable for the component C are esters of mono- or di-carboxylic acids having approximately 2 to 15 carbon atoms, preferably monocarboxylic acids, and monohydric or dihydric alcohols having approximately 1 to 10 carbon atoms, preferably monohydric alcohols. The organic acid ester can be selected from esters of an aliphatic carboxylic acid, of an alicyclic carboxylic acid and of an aromatic carboxylic acid. Esters of an aromatic acid are preferable.

Examples of the organic acid ester are aliphatic carboxylic esters, such as methyl acetate, butyl acetate, isopropyl butyrate, and methyl laurate; alicyclic carboxylic esters, such as methyl cyclohexane carboxylate; and, aromatic carboxylic esters, such as ethyl benzoate, isopropyl benzoate, methyl toluylate, methyl anisate, dimethyl phthalate and methyl chlorobenzoate.

Among these organic acid esters, the use of aromatic carboxylic esters gives the best results for the present invention.

The organic acid ester is used in a molar ratio of organic acid ester to component B of from 0.01 to 0.6, preferably from 0.1 to 0.3.

(4) Preparation of catalyst

The above mentioned components A and B or A, B, and C may be combined with each other either in the olefin polymerization zone or outside the olefin polymerization zone. These components can be used, before being fed to the polymerization zone, for pre-polymerization of the olefin at a temperature of from 0° to 100° C. under a pressure of from 1 to 100 atm for from 10 minutes to 10 hours before they are fed into the polymerization zone. Since the solid component A or the components A and B are injected into the polymerization zone of high pressure by means of a high-pressure pump, these components must be in the form of a liquid or fine particles or their slurry. Accordingly, it is desirable that these components have a particle size of about $10\mu$ or less, preferably from approximately 1 to $5\mu$.

2. Polymerization of ethylene

(1) Polymerization apparatus

The polymerization process of the present invention can be carried out by a batch process, but it is preferable that the polymerization process be carried out in a continuous manner. The polymerization apparatus usable for the present process can be of the type conventionally used for the high pressure radical polymerization process of ethylene. Specifically, a continuous stirred tank reactor or a continuous tubular type reactor may be used.

The polymerization can be carried out by using such a single reactor as those shown above in a single zone method. Alternatively, a number of reactors connected to each other in series and respectively provided with a cooling means, if necessary, or a single reactor which is effectively divided into a plurality of zones, can be used. In the case where a number of rectors or a single reactor having a plurality of zones is used, the ordinary practice is to control the monomer composition, the catalyst concentration, the concentration of a molecular weight modifier and the like for each reactor or zone so as to differentiate the reaction conditions of the reactors or zones from each other, thereby controlling the characteristics of the polymer obtained in each reactor or zone. In the case where a plurality of reactors connected to each other in series are used, in addition to a combination of two or more tank type or autoclave reactors or tubular type reactors, a combination of one or more tank type reactors and one or more tubular type reactors may be used.

The polymer formed in one or more reactors is separated from the non-reacted monomer, and then the resultant polymer can be treated without removing the catalyst residue therefrom as in the case of a conventional high-pressure method. In the case of a conventional low-pressure method using a Ziegler catalyst, removal of the catalyst residue is a process which is expensive and time-consuming. The non-reacted monomer mixture separated from the product is mixed with an additional amount of the same monomer or monomers, and the resultant mixture after being pressurized is recycled into the reactor. The monomer additionally added has a composition such as to allow the monomer mixture to restore the original feed composition. Ordinarily, the additional monomer or monomers has or have a composition approximately corresponding to the monomeric composition of the polymer separated from the reactor or reactors.

The catalyst is, for example, finely dispersed in any suitable inert liquid, and the resultant fine dispersion is injected directly into the reactor by means of a high-pressure pump. Suitable inert liquids are white spirit, hydrocarbon oil, pentane, hexane, cyclohexane, heptane, toluene, higher branched saturated aliphatic hydrocarbons and mixtures thereof. The dispersion is stored preferably under a seal of nitrogen in order to prevent it from coming into contact with water and air before it is introduced into the reactor. Also, ethylene and other monomers should contain no substantial amounts of water and air.

As stated above, the polymer produced can be processed without removing the catalyst residue therefrom. This is ascribable to the fact that because of very high activity and high thermal resistance of the catalyst in accordance with the present invention, the quantity of the catalyst residue in the polymer obtained is at a low level and it is not converted into a coloring matter which causes the hue of the resultant polymer to deteriorate.

(2) Monomer and comonomer

The polymerization which is carried out in the presence of the catalyst of the present invention is the homopolymerization of ethylene or the copolymerization of ethylene with at least one of other α-olefins having the formula: $R-CH=CH_2$. In the case of the homopolymerization of ethylene, the resultant polymer usually is high density polyethylene having a density or specific gravity of from 0.95 to 0.97.

Examples of a comonomer having the formula $R-CH=CH_2$, in which R represents a hydrocarbon residue having 1 to 12 carbon atoms, are propylene, butene-1, pentene-1, hexene-1, heptene-1, octene-1, nonene-1, 4-methylpentene-1 and decene-1. These α-olefins can be copolymerized up to an amount of 30% by weight, preferably from 3 to 20% by weight, based on the weight of the resultant copolymer. The copolymerization of ethylene with these α-olefins provides polymers having a wide range of a density. The density of the polymer depends on the type of the comonomer used, the feed composition of the comonomer, and other factors. More specifically, a polymer having a desired density of from approximately 0.890 to 0.955, preferably from approximately 0.89 to 0.94, can be obtained.

The process of the present invention is particularly suitable for the production of the above-mentioned copolymers and can provide intermediate through low density ethylene copolymers in high yield.

These copolymers are not only different in density from conventional low-pressure high-density polyethylenes but are also different in nature from conventional high-pressure low-density polyethylenes. That is, these copolymers contain substantially no long branched chain and have a narrow molecular-weight distribution in terms of Q value of from 3 to 5, therefore, exhibiting excellent mechanical strength, particularly tensile strength, and resistance to environmental stress rupture.

(3) Polymerization condition (1) Polymerization pressure

The polymerization pressure adopted in the present invention is a pressure exceeding 300 kg/cm$^2$ and is preferably in the range of from 500 to 3,500 kg/cm$^2$.

(2) Polymerization temperature

The polymerization temperature is at least 180° C. and preferably in the range of from 200° to 320° C.

Although not considered essential, the polymerization reaction mixture may form a single fluid phase or may separate into two phases under a combination of the polymerization pressure and temperature adopted.

(3) Composition of gas fed into reactor

The composition of the gas to be fed into the reactor which may be adopted in the present invention, is ordinarily 5 to 100% by weight of ethylene, 0 to 95% by weight of at least one α-olefinic comonomer and 0 to 20 molar % of hydrogen as a molecular-weight modifier.

(4) Residence time

The average residence time in the reactor is relevant to duration of the activity of the catalyst under the reaction conditions adopted. The half-life period of the catalyst used is influenced by the reaction conditions, particularly reaction temperature. When the catalyst has a longer life, it is preferable to extend the residence time of the monomer in the reactor. The average residence time usable for the present invention is in the range of from 10 to 150 seconds, preferably from 10 to 120 seconds, still more preferably from 20 to 100 seconds.

EXAMPLES

Example A1

Preparation of catalytic components

A stainless steel pot having an internal volume of 1 liter was charged with 12.7 mm balls made of stainless steel in an amount of 900 ml in terms of apparent volume. Then, 50 g of titanium trichloride [TiCl$_3$(AA)], which was prepared by reducing titanium tetrachloride with metallic aluminum and was previously subjected to pulverization treatment for 40 hours, 120 g of anhydrous magnesium chloride and 30 g of methyl methacrylate were placed in the pot under a nitrogen atmosphere and the pot was sealed. Thereafter, pulverization was carried out for 80 hours by starting the operation of the vibration mill. The vibrational amplitude was 5 mm, and the rotational speed of the motor was 1,700 rpm. After the pulverizing procedure was completed, the resultant pulverized solid composition was removed from the mill and placed in a dry box.

Preparation of a catalyst dispersion

A 1-liter flask the air within which had been completely replaced with nitrogen was charged with 300 ml of n-hexane thoroughly deaerated, and, then, with 5 g of the above-prepared solid component (a) and diethylaluminum chloride and diethylaluminum ethoxide in a molar ratio of 5:1, so as to carry out pre-activation. The atomic ratio of Al/Ti was 16. Then, hexene-1, which had been thoroughly deaerated, was added to the flask so as to adjust the molar ratio of hexene/Ti to 10. Subsequently, the mixture was stirred for 2 hours to obtain a fine catalyst suspension. The catalyst suspension was placed in a catalyst-preparing tank provided with a stirrer in which the atmosphere was replaced with dry nitrogen. Then, n-hexene, which had been thoroughly deaerated, was added to the tank until the total volume of the mixture was 25 liters, so as to adjust the concentration of the solid ingredient to 0.2 g/liter. The resultant catalyst is called catalyst (a)-1.

High-pressure polymerization of ethylene

Ethylene and hexene-1 were copolymerized in a stirred autoclave type continuous reactor having an internal volume of 1.5 liters under the reaction conditions indicated in Table A1. The above-mentioned catalyst (a)-1 was used as the catalyst. As a result of the polymerization, a polymer having no coloring, with a b value of 2.0, an excellent hue, an MFR of 1.53, and a density of 0.9203 was obtained. The activity of the catalyst was 21,000 in terms of yield per catalyst (g·PE/g·solid catalyst ingredient) and 350,000 in terms of yield per g of Ti (g·PE/g·Ti).

Comparative Example A1

The catalyst dispersion-preparing and ethylene polymerizing procedures described in Example A1 were repeated except that the methyl methacrylate was not used in the preparation of the catalytic component of Example A1. As a result of the polymerization, a polymer having a grey color and a very poor hue was obtained. The activity of the catalyst was 6,800 in terms of yield per catalyst, and 98,000 in terms of yield per g of Ti.

Examples A2 through A6

Catalytic components (c) through (g) and catalyst dispersions (c)-1 through (g)-1 were prepared according to the procedures described in Example A1 except that in the preparation of the catalyst component of Example A1, the following compounds were used in place of methyl methacrylate. The high-pressure polymerization of ethylene was carried out as described in Example A1.

| Example No. | Additive | Quantity (g) |
| --- | --- | --- |
| A2 | Dibutylether | 39 |
| A3 | Dibutylketone | 42 |
| A4 | Ethyl benzoate | 45 |
| A5 | Isobutylaldehyde | 22 |
| A6 | n-Butyl alcohol | 23 |

The results of the polymerization are shown in Table A1.

Examples A7 through A9 and Comparative Example A2

Catalyst dispersions (a)-2 through (b)-2 were prepared according to the procedures described in Example A1 except that the organoaluminum compound used in the preparation of the catalyst dispersion of Example A1 was changed as shown below. The polymerization procedures described in Example A1 were repeated. The results are shown in Table A1.

| Example No. | Composition of organoaluminum compound used (mol. %) | | Catalyst dispersion obtained |
|---|---|---|---|
| A7 | DEAC* | 80 | (a)-2 |
| | Trimethyldiethyl-siloxalane | 20 | |
| A8 | DEAC | 88 | (a)-3 |
| | TEA* | 12 | |
| A9 | DEAC | 100 | (a)-4 |
| Com. Ex. A2 | TEA | 100 | (b)-2 |

*DEAC: diethylaluminum chloride
TEA: triethylaluminum

Examples A10 through A12

Catalyst dispersions (b)-1 through (j)-1 were prepared according to the procedures described in Example A1, except that the amount of the methyl methacrylate (MMA) used in the preparation of the catalytic component of Example A1 was changed as shown below. The polymerization procedures described in Example 1A were repeated. The results are shown in Table A1.

| Example No. | Quantity of MMA used (g) | Catalyst dispersion obtained |
|---|---|---|
| A10 | 10 | (h)-1 |
| A11 | 20 | (i)-1 |
| A12 | 40 | (j)-1 |

Example B1

Preparation of catalytic component

The catalytic component (a) prepared in Example A1 was used.

Preparation of catalyst dispersion

A 1-liter flask the air within which had been completely replaced with nitrogen was charged with 300 ml of n-hexane thoroughly deaerated and then with 5 g of the above-mentioned solid component (a), 4.8 g of diethylaluminum chloride, 4.9 g of ethylaluminum sesquichloride and 3.3 g of ethyl p-toluylate (hereinafter referred to as PTE). Then, the mixture was heated to a temperature of 40° C. and was stirred for 2 hours to obtain a fine catalyst suspension. The catalyst suspension was placed in a catalyst-preparing tank provided with a stirrer in which the atmosphere had been replaced with dry nitrogen. Then, n-hexane was added to the tank until the total volume of the mixture was 25 liters, so as to adjust the concentration of the solid ingredient to 0.2 g/liter. The resultant catalyst is called catalyst (a)-1.

High-pressure polymerization of ethylene

Ethylene and hexene-1 were copolymerized in a stirred autoclave type continuous reactor having an internal volume of 1.5 liters under the reaction conditions indicated in Table B1. The above-mentioned catalyst (a)-1 was used as the catalyst. As a result of the polymerization, a polymer having an excellent hue (b value=0.4) was obtained. The activity of the catalyst (g·PE/g·solid catalyst ingredient) was 22,300. The melt flow rate (MFR) of the polymer was measured at a temperature of 190° C. under a load of 2.16 kg and was found to be 1.03. Also, the polymer had a density of 0.9192 g/cm$^2$ and a 1-C$_6$ content of 9.7% by weight.

Examples B2 and B3

The polymerization procedures described in Example B1 were repeated except that the amount of 1-hexene fed was changed as shown in Table B1. The results are shown in Table B1.

Comparative Example B1

The catalyst dispersion-preparing procedures described in Example B1 were repeated except that no PTE was used in the preparation of the catalyst dispersion of Example B1. The copolymerization of ethylene with hexene-1 was carried out according to the polymerization procedures described in Example B1.

The activity of the catalyst was 23,100. The resultant polymer exhibited an MFR of 1.30, a density of 0.9341, and a 1-C$_6$ content of 5.4% by weight.

Comparing Example B1 with Comparative Example B1, it is apparent that Comparative Example B1 results in a small decrease in density and a poor degree of copolymerization.

TABLE A1

| Example No. | Condition of polymerization reaction | | | Feed | | | Catalyst | Yield per catalyst (g · PE/g · solid catalyst) | Polymer MFR (g/10 min) | Polymer density (g/cm$^3$) | Hue of polymer b value*[1] |
|---|---|---|---|---|---|---|---|---|---|---|---|
| | Pressure (Kg/cm$^2$) | Temperature (°C.) | Temperature of feed gas (°C.) | Total amount of feed (Kg/hr) | Content of hexene-1 (wt %) | Hydrogen content (mol %) | | | | | |
| Ex. A1 | 1000 | 240 | 80 | 30 | 70 | 0.3 | (a)-1 | 21,000 | 1.53 | 0.9203 | 2.0 |
| Comp. Ex. A1 | " | " | " | " | " | " | (b)-1 | 6,800 | 0.85 | 0.9247 | 7.3 |
| Ex. A2 | " | " | " | " | " | " | (c)-1 | 18,300 | 4.17 | 0.9221 | 0.3 |
| Ex. A3 | " | " | " | " | " | " | (d)-1 | 21,100 | 2.38 | 0.9270 | 1.2 |
| Ex. A4 | " | " | " | " | " | " | (e)-1 | 16,600 | 1.78 | 0.9230 | 1.9 |
| Ex. A5 | " | " | " | " | " | " | (f)-1 | 13,500 | 1.54 | 0.9203 | 3.9 |
| Ex. A6 | " | " | " | " | " | " | (g)-1 | 10,600 | 1.03 | 0.9258 | 5.1 |
| Ex. A7 | " | " | " | " | " | " | (a)-2 | 19,200 | 1.16 | 0.9214 | 2.0 |
| Ex. A8 | " | " | " | " | " | " | (a)-3 | 15,100 | 1.71 | 0.9276 | 2.3 |
| Ex. A9 | " | " | " | " | " | " | (a)-4 | 13,300 | 3.10 | 0.9187 | 1.4 |
| Comp. Ex. A2 | " | " | " | " | " | " | (b)-5 | 9,800 | 0.91 | 0.9231 | 6.7 |
| Ex. A10 | " | " | " | " | " | " | (h)-1 | 17,000 | 1.53 | 0.9224 | 2.1 |
| Ex. A11 | " | " | " | " | " | " | (i)-1 | 20,100 | 1.92 | 0.9205 | 1.8 |
| Ex. A12 | " | " | " | " | " | " | (j)-1 | 19,300 | 2.71 | 0.9190 | −0.7 |

*[1]determined according to a JIS-K-7103 method.

Examples B4 through B6, Comparative Examples B2 and B3

The catalyst dispersion-preparing procedures described in Example B1 were repeated except that the organic acid esters or electron donors indicated below were used in place of the PTE. The copolymerization of ethylene with hexene-1 was carried out according to the procedures described in Example B1. The results are shown in Table B1.

In Comparative Examples B2 and B3, the resultant catalyst exhibited a high activity of copolymerization but the degree of copolymerization of the polymer was not improved.

| Example No. | Electron donor used | Quantity (g) |
| --- | --- | --- |
| B4 | Ethyl anisate | 3.6 |
| B5 | Ethyl benzoate | 3.0 |
| B6 | Methyl methacrylate | 2.0 |
| Comp. Ex. B2 | Acetone | 1.2 |
| Comp. Ex. B3 | n-Octylether | 4.8 |

Examples B7 and B8

The catalyst dispersion-preparing procedures described in Example B1 were repeated except that in Example B7, 7.2 g of diethylaluminum chloride was used in place of the organoaluminum compound used in Example B1, and in Example B8, 13.2 g of ethylaluminum sesquichloride was used in place of the organoaluminum compound used in Example B1. The copolymerization of ethylene with hexene-1 was carried out according to the procedures described in Example B1.

Comparative Example B4

The catalyst dispersion-preparing procedures described in Example B1 were repeated except that, in place of the diethylaluminum chloride and ethylaluminum sesquichloride, trioctylaluminum was used. The copolymerization of ethylene with hexene-1 was carried out according to the procedures described in Example B1. The results are shown in Table B1.

The catalyst exhibited a low activity of copolymerization, and the degree of copolymerization of the polymer was not improved.

Examples B9 through B11

The catalytic component-preparing and catalyst dispersion-preparing procedures described in Example B1 were repeated except that the compounds indicated below were used in place of the methyl methacrylate. The copolymerization of ethylene with hexene-1 was carried out according to the procedures described in Example B1. The results are shown in Table B1.

| Example No. | Electron donor used | Quantity (g) |
| --- | --- | --- |
| B9 | Ethyl benzoate | 45 |
| B10 | n-Butylether | 39 |
| B11 | Di-n-butyl phthalate | 83 |

Examples B12 and B13

The copolymerization of ethylene with an α-olefin was carried out according to the procedures described in Example B1 except that the α-olefins indicated in Table B1 were used in place of the 1-hexene. The results are shown in Table B1.

Comparative Examples B5 and B6

The copolymerization of ethylene with an α-olefin was carried out according to the procedures described in Examples B12 and B13 except that the catalyst dispersion of Comparative Example B1 was used as the catalyst dispersion. The results are shown in Table B1.

TABLE B1

| Example No. | Condition of polymerization reaction | | | Feed | | | | Yield per catalyst (g · PE/g · solid catalyst) | Polymer MFR (g/10 min) | Polymer density (g/cm$^3$) | Comonomer content in polymer (wt %) | Hue of polymer (b value) |
| --- | --- | --- | --- | --- | --- | --- | --- | --- | --- | --- | --- | --- |
| | Pressure (Kg/cm$^2$) | Temperature (°C.) | Temperature of feed gas (°C.) | Total amount of feed (Kg/hr) | Type of co-monomer | Comonomer content (wt %) | Hydrogen (mol %) | | | | | |
| Ex. B1 | 1000 | 240 | 80 | 30 | hexene-1 | 55 | 0.3 | 22,300 | 1.03 | 0.9192 | 9.7 | 0.4 |
| Ex. B2 | " | " | " | " | " | 45 | " | 21,800 | 0.92 | 0.9318 | 5.6 | 0.3 |
| Ex. B3 | " | " | " | " | " | 70 | " | 20,500 | 1.71 | 0.9103 | 11.7 | 0.7 |
| Comp. Ex. B1 | " | " | " | " | " | 55 | " | 23,100 | 1.30 | 0.9341 | 5.4 | 1.9 |
| Ex. B4 | " | " | " | " | " | " | " | 21,500 | 1.21 | 0.9170 | 10.1 | −0.2 |
| Ex. B5 | " | " | " | " | " | " | " | 20,600 | 1.89 | 0.9187 | 9.9 | 1.5 |
| Ex. B6 | " | " | " | " | " | " | " | 17,500 | 1.06 | 0.9295 | 6.8 | 1.8 |
| Comp. Ex. B2 | " | " | " | " | " | " | " | 19,600 | 0.82 | 0.9344 | 5.5 | 2.1 |
| Ex. B3 | " | " | " | " | " | " | " | 22,500 | 1.94 | 0.9338 | 5.7 | 1.4 |
| Ex. B7 | " | " | " | " | " | " | " | 28,400 | 2.37 | 0.9202 | 9.4 | 0.1 |
| Ex. B8 | " | " | " | " | " | " | " | 13,800 | 1.15 | 0.9183 | 10.0 | 2.1 |
| Comp. Ex. B4 | " | " | " | " | " | " | " | 10,000 | 1.76 | 0.9328 | 5.8 | 6.7 |
| Ex. B9 | " | " | " | " | " | " | " | 21,700 | 1.82 | 0.9189 | 9.9 | 1.9 |
| Ex. B10 | " | " | " | " | " | " | " | 20,300 | 1.90 | 0.9212 | 9.5 | −0.2 |
| Ex. B11 | " | " | " | " | " | " | " | 22,800 | 2.87 | 0.9208 | 9.5 | 0.4 |
| Ex. B12 | " | " | " | " | butene-1 | 50 | " | 19,900 | 2.13 | 0.9176 | 9.3 | 1.8 |
| Ex. B13 | " | " | " | " | octene-1 | 55 | " | 24,100 | 1.41 | 0.9221 | 10.0 | 0.3 |
| Comp. Ex. B5 | " | " | " | " | butene-1 | 50 | " | 20,300 | 1.73 | 0.9320 | 4.8 | 0.5 |
| Ex. B6 | " | " | " | " | octene-1 | 55 | " | 25,000 | 1.12 | 0.9347 | 5.6 | −0.1 |

What is claimed is:

1. A process for copolymerizing ethylene, with an α-olefin, comprising bringing ethylene and an α-olefin into contact with a catalyst comprising a combination of the following components A, B, and C under the conditions of a pressure of at least 300 kg/cm$^2$, a temperature of at least 180° C., a contact time of 10 to 150 seconds, and substantial absence of a solvent, thereby to obtain a copolymer having a density of from 0.890 to 0.940 g/cm$^3$ and comprising 3–20% by weight of the polymer of the α-olefin copolymerized:

a solid composition prepared by mixing and pulverizing the following compounds (1), (2), and (3):
(1) a magnesium dihalide
(2) titanium trichloride
(3) an oxygen containing electron donative organic compound;

Component B comprising:
an organoaluminum compound containing a halogen group of the formula $R_{3-m}AlX_m$ where R represents a hydrocarbon residue having 1 to 10 carbon atoms, X represents a halogen atom and $0<m<2$; and Component C comprising:
an organic acid ester of a mono- or di-carboxylic acid having 2 to 15 carbon atoms.

2. A process as claimed in claim 1, wherein said component C is an ester of an aromatic carboxylic acid.

3. A process as claimed in claim 1, wherein said electron donative compound of said component A is selected from ketones, esters and ethers.

4. A process according to claim 1 where the compounds (1) and (3) of Component A are (1) magnesium-dichloride, and (3) methyl methacrylate, ethyl benzoate, N-butyl ether or di-n-butyl phthalate, the halogen containing organoaluminum compound of Component B is diethylaluminum chloride or ethylaluminum sesquichloride and the organic acid ester of Component C is ethyl p-toluylate, ethyl anisate, ethyl benzoate, or methyl methacrylate.

5. A process according to claim 3 where the α-olefin is hexene-1.

6. A process according to claim 2 where the α-olefin is butene-1, hexene-1 or octene-1.

7. A process according to claim 1 where the component A is such that the mole ratio of the magnesium dihalide (1) to the titanium chloride (2) is 3/1 to 50/1, and the quantity of the electron donative organic compound (3) is 1 to 20% by weight based on the total of the three components (1) through (3).

8. A process according to claim 1 where the quantity of the components A, B and C are such that the atomic ratio of Al/Ti is 1 to 100 and the mole ratio of component C/component B is 0.01 to 0.6.

9. A process according to claim 1 where component A further comprises a component selected from the group consisting of SiCl$_4$, methylhydrogen polysiloxanes and AlCl$_3$ in a quantity to provide an atomic ratio of M/Ti of 0.01 to 0.2 where M is Si or Al.

10. A process according to claim 7 where the quantity of the components A, B and C are such that the atomic ratio of Al/Ti is 1 to 100 and the mole ratio of the component C/component B is 0.01 to 0.6.

* * * * *